United States Patent [19]
Hill

[11] 3,770,084
[45] Nov. 6, 1973

[54] VEHICLE BRAKE ACTUATOR AND LOCK ASSEMBLY

[75] Inventor: Albert Charles Hill, Tyseley, Birmingham, England

[73] Assignee: Girling Limited, Birmingham, England

[22] Filed: June 2, 1971

[21] Appl. No.: 149,197

[30] Foreign Application Priority Data
June 2, 1970  Great Britain ............... 26,531/70

[52] U.S. Cl. .................. 188/265, 92/17, 303/89
[51] Int. Cl. ............................................. F16d 63/00
[58] Field of Search .................. 188/265; 303/89; 92/17

[56] References Cited
UNITED STATES PATENTS

| 2,773,485 | 12/1956 | Geyer | 92/17 |
| 2,804,053 | 8/1957 | Geyer | 92/17 |
| 3,472,124 | 10/1969 | Roselius et al. | 188/265 |
| 3,613,841 | 10/1971 | Newsteed | 188/265 |
| 3,684,063 | 8/1972 | Crabtree | 92/17 X |

FOREIGN PATENTS OR APPLICATIONS

| 1,162,215 | 9/1957 | Germany | 188/265 |

Primary Examiner—George E. A. Halvosa
Attorney—Scrivener, Parker, Scrivener and Clarke

[57] ABSTRACT

A lock actuator of the type employed for locking on the brakes of a road vehicle and comprising an extensible strut and a clutch for locking the strut in extending condition is characterized by the fact that the clutch has substantial clearance built into it and the usual clutch spring is omitted, so that some relaxation (shortening) of the clutch is permitted before the strut finally locks. The lock actuator may form an independent unit or be built into a slave cylinder of a wheel brake.

5 Claims, 3 Drawing Figures

FIG. I.

VEHICLE BRAKE ACTUATOR AND LOCK ASSEMBLY

This invention relates to vehicle brakes and in particular to locking means adapted to hold a vehicle brake applied after the release of braking pressure. Such locking means are usually referred to in the art as lock actuators.

We have already proposed, in prior, co-pending patent applications, lock actuators designed for use in drum brakes, comprising an extensible strut, a friction clutch associated with the strut and having an engaged condition in which it locks the strut against contraction, and clutch operating means for selecting the engaged and disengaged conditions of the clutch, and wherein the clutch comprises a pair of co-operating parts movable into and out of clutching engagement with each other, the said parts having a substantial working clearance which is at a maximum when the strut is under tensile loading.

In the arrangements previously proposed by us and by others, resilient means act upon the clutch to bias it towards the engaged condition, and the clutch operating means normally holds the clutch disengaged against this resilient bias, the operating means usually comprising an auxiliary cylinder. Thus, during normal running of the vehicle, the auxiliary cylinder is pressurised so that the strut is free to contract with the shoe upon service brake pressure release, hand brake operation being effected when required by release of pressure from the auxiliary cylinder to permit the resilient biasing means to move the clutch to its engaged condition, so preventing retraction of the strut upon the subsequent release of the service brake pressure, with the result that the shoe is held in braking engagement with the drum.

It has also been proposed to provide means to ensure that the service brake pressure is adequate to ensure safe parking before the hand brake can be operated, conveniently by means of a "gate" through which the hand brake control must pass and with which is associated a valve controlling pressure applied to the service brake.

The provision of the resilient means acting to take up the clearance between the clutch parts prior to the release of the service brake actuating pressure from the working chamber of the wheel cylinder results in those clearances which remain to be taken up, prior to the lock becoming fully effective, being relatively small. The service brake pressure to be supplied to the working chamber from the hand brake control needs therefore to be only slightly greater than that adequate for the required shoe-tip effort for safe parking. If at the instant of operating the parking lock the pressure in the working chamber exceeds this pressure, the lock cannot subsequently be released merely by moving the hand brake control through the "gate." Further, if the service brake (foot brake) is applied after the parking sequence has been followed, the locking means could be extended to lock in a higher shoe-tip effort, and if this were associated with an increasing compressive force on the locking means due to cooling of the brake drum, the service brake pressure which could subsequently be applied by the foot would be insufficient to release the brake.

The present invention aims at reducing this difficulty, and is mainly characterized by the fact that the clearance between the clutch parts is taken up only when the said clutch operating means is operated to permit engagement of the clutch, and the strut is subjected to compressive loading.

This results in a relatively large relaxation of the brake shoes from the "shoes applied" condition to the "shoe locked" condition, with a correspondingly large difference in the shoe tip efforts in these two conditions.

The lock actuator of the present invention may be incorporated in a wheel slave cylinder, or may form a separate unit designed to act, for example, between a brake shoe and a back plate, or between opposed brake shoes.

Two forms of lock actuator in accordance with the invention, incorporated in both hydraulic slave cylinders, are described below, by way of example, with reference to the accompanying drawings, in which.

Figure 1:
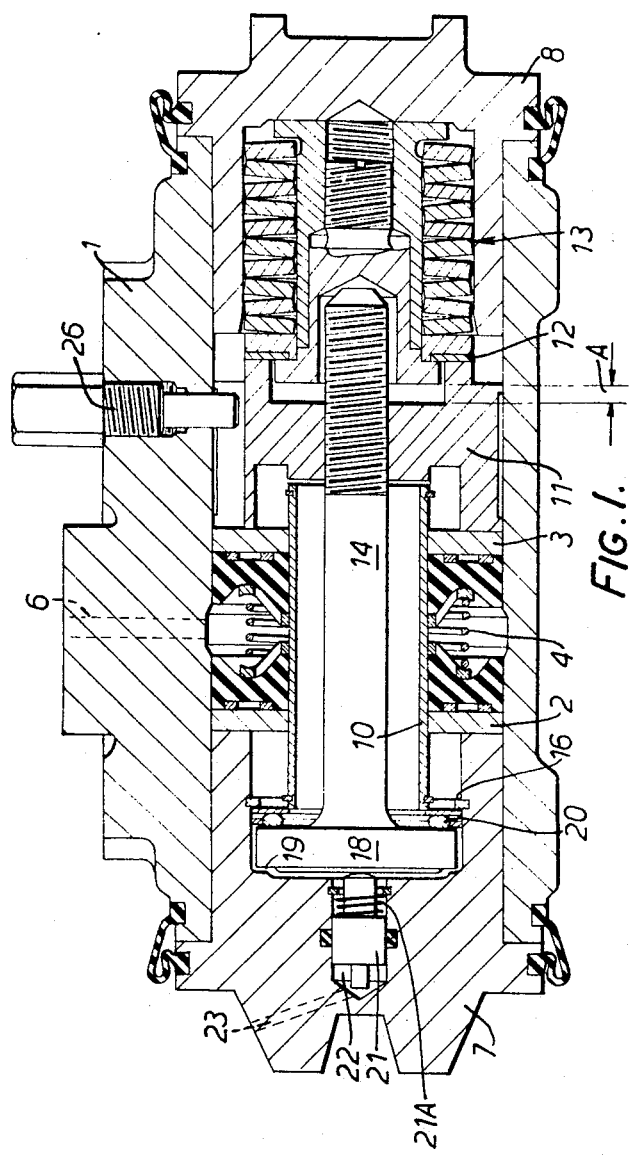
FIG. 1 shows a hydraulic slave cylinder in axial cross section.

The slave cylinder shown in the drawing is of the double-ended type commonly used in vehicle drum brakes having two internal shoes. It comprises a housing, or cylinder body 1 having opposed annular pistons 2 and 3 separately sealed and exposed at their adjacent ends to the pressure in a central working chamber 4 having a pressure port 6 and defined in part by a tubular member 10, which extends in sliding sealed relation through the pistons 2 and 3. A pair of opposed thrust members in the form of tappets 7 and 8 are mounted at the ends of the housing 1 and in use these tappets engage the adjacent ends of respective brake shoes or brake shoe carriers. The left-hand piston 2 has its outer end in direct abutting engagement with the respective tappet 7, while the other piston 3 engages the adjacent tappet 9 through the intermediary of a ring part 11, a thrust bearing 12 and a resilient overload device in the form of a pack 13 of belleville spring washers arranged in groups which are alternately reversed with respect to their conicity.

The ring part 11 forms one member of an extensible strut, the other member of which is formed by a central shaft part 14, which has a reversible screw-thread connection with the ring 11. The screw-threads have a coefficient of friction which is low, but at least sufficient to prevent free relative rotation if, for example, the strut is mounted in a vertical attitude.

The left-hand end of the shaft has a head 18, the outer face 19 of which forms a friction clutch face for co-operation with the adjacent, inner face of the left-hand tappet 7, and is engageable by the piston 21 of an auxiliary fluid pressure motor. The piston 21 works in a chamber 22 formed in the tappet 7 and having a fluid pressure port 23. A needle roller thrust bearing 20 for the inner side of the head 18 is supported by a split ring 16 and the head has a relatively large degree of axial clearance between the clutch face on the one hand and the thrust race 20 on the other. The thrust bearing 20 may be a P.T.F.E. impregnated or coated washer, or other low friction device.

The piston 21 has a piston spring 21A urging the piston outwardly, i.e., away from the head 18.

In the normal operative condition of the slave cylinder, chamber 22 is pressurised and the piston 21 holds the head 18 of shaft 14 against the thrust race 20, so that the clutch face 19 is clear of the tappet 7, and the shaft is therefore free to rotate relative to the ring 11, which is keyed against rotation by a removable pin 26.

With the chamber 21 pressurised, operation of the hydraulic brakes forces the pistons 2 and 3, with their associated tappets, outwardly to apply the brake shoes to the drum, and when the brake applying pressure is released the piston and tappets are forced back towards each other by the shoe return springs. These movements of the tappets towards and away from each other are freely followed up by the strut 11, 14 since the ring 11 is forced to follow the movements of piston 3 and tappet 8, and the shaft 14 is constrained by the thrust race 20 to follow the movement of tappet 7. The reversible screw-thread causes the shaft to rotate during this relative axial movement of the shaft and ring.

If the driver wishes to park the vehicle, he operates a control valve to apply pressure to the chamber 4 and then, while that pressure is held, to release the pressure in chamber 22, whereupon the piston 21 is retracted by its spring 21A. The braking pressure in chamber 4 is then relaxed and the tappets 7 and 8 are pressed towards each other by the shoe return springs, the resilience of the shoes and drum, and under certain conditions the resilient over-load device 13. These compressive forces are transmitted by the tappets to the strut parts 11 and 14, and the clearance between tappet 7 and the clutch face 19 is thus taken up to engage the friction clutch. Any clearance (due to manufacturing tolerances) in the screw thread is also taken up and the strut is now locked in an extended position.

To release the parking brake, the chamber 22 is pressurised, releasing the friction clutch so that the shaft can rotate again relative to the ring. The thrust forces which can be transmitted back to the strut are limited by the resilient overload device 13 which is so designed that it has substantially zero deflection up to a predetermined compressive load, and can then deflect at a relatively low spring rate. Without this safeguard, it would be possible for the thrust applied to the struts to be in excess of that which can be overcome by the auxiliary motor. For example, very large thrusts could be generated if the strut were locked while the brake drum was overheated and then subjected to the thermal contraction forces transmitted back through the brake shoes. If, in spite of this precaution, the strut should remain locked, the parts can be freed for relative rotation by removal of the pin 26.

It may be desirable in some cases to limit the possible deflection of the spring washers 13 under high loading conditions by suitable dimensioning of the adjacent components so that these provide a positive mechanical restraint against deflection above a predetermined maximum. For example, the clearance 'A' can be dimensioned to correspond with the desired maximum deflection of the spring washers.

By building in a relatively large clearance between the clutch faces of the friction clutch, and arranging that this clearance is not taken up until the piston 21 is retracted and the service brake pressure in the main chamber is relaxed (so that the strut is subjected to compressive loading by the shoe return springs), a relatively large total tappet movement is ensured between the "brake shoes applied" condition and the "brake shoes locked" condition.

In view of the larger relaxation movement now permitted, it is necessary, in order to ensure a predetermined minimum effective shoe tip effect in the "shoes locked" condition, to apply a higher pressure upon shoe application. This is very easily achieved by means of a simple gate type hand control valve which the driver uses for parking operations and has an advantage in that the pressure applied by this means will normally be much higher than that applied by the driver through his foot brake. Thus we reduce the risk of the driver "locking in" an excessive braking effort by applying the lock simultaneously with a foot brake operation. To take a simple example, a four-wheeled vehicle may require a brake pressure for adequate braking on all four wheels of about 800 p.s.i. However, if the vehicle is parked (as is normal) on only two brakes, the shoe tip effort required of the parking brakes will correspond with an applied braking pressure in those two brakes in the order of 1,300 p.s.i. To allow for the tappet relaxation referred to above, a pressure of about 1,500 p.s.i. would be supplied before bringing the lock into operation by relieving pressure in the auxiliary chamber 22. The lock becomes fully effective, i.e., all clearances (and any structural deflections) under a shoe tip effort corresponding to 1,300 p.s.i.

This final, locked, condition will be so calculated that the resilient overload washers 13 are under a small deflection from their normal pre-loaded condition in order to allow a useful amount of further deflection to take account of any thermal contraction of the drum. Of course, if such contraction takes place, the effective shoe tip effort and washer deflection will be higher when the drum has fully cooled.

In a simple control system for use in the manner described above system pressure from a reservoir at say 2,000 p.s.i. is passed through to the wheel cylinders by a foot pedal operating a treadle valve or the like, and then into one inlet of a changeover valve whose outlet is connected to the cylinder space 4. For manual parking brake operation there is a manually operated 'h' gate valve movable in one direction to pass pressure through to the other side of the changeover valve and movable in a direction at right angles to reduce pressure in the auxiliary chamber 22. The point at which the pressure to chamber 22 can be reduced corresponds with a pressure of 1,500 p.s.i. in the line to the changeover valve, so that the chamber 22 can only be relieved and re-pressurized at a line pressure of 1,500 p.s.i.

The changeover valve passes the higher inlet pressure prevailing, in the event of both the foot and manual controls being operated at once.

Figure 2:
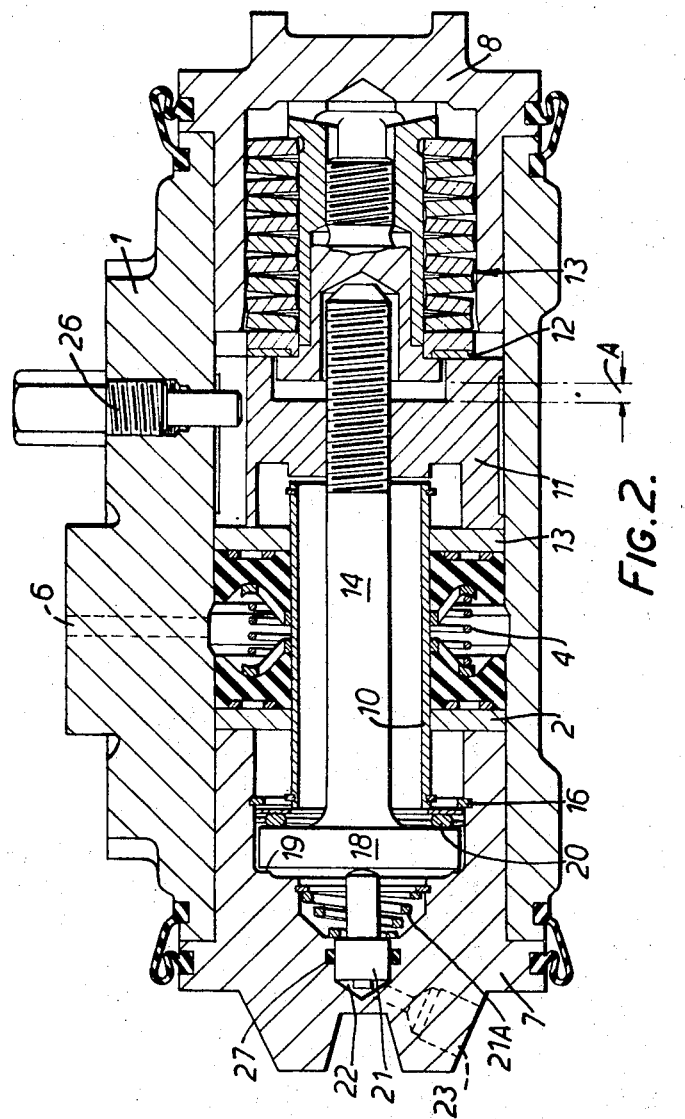
FIG. 2 shows a modified hydraulic slave cylinder, also in axial cross section.

FIG. 2 shows a similar hydraulic slave cylinder to that of FIG. 1 and corresponding parts have the same reference numerals.

This embodiment has a modified release piston chamber designed to enable easier machining and to prevent the piston seal 27 having to be fitted over a circlip groove supporting the spring 21A as in the embodiment of FIG. 1.

Figure 3:
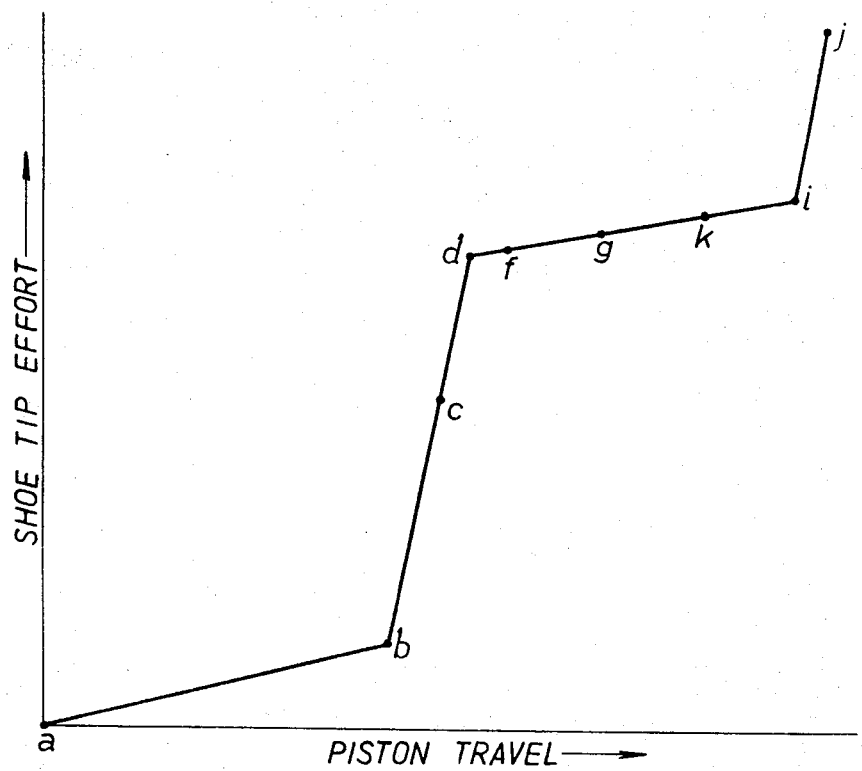
FIG. 3 is a graph of shoe tip effort plotted against slave piston travel.

FIG. 3 is a graph of the shoe-tip effort against piston travel, applicable to both the above described embodiments. From $a$ to $b$ there is a large piston travel with only a small increase in shoe-tip effort as the shoe is brought into contact with the drum; from $b$ to $d$ there is a rapid increase in shoe-tip effort for a small increase in piston travel, corresponding to the normal foot brake or service brake operation, e.g., $c$; from $d$ to $i$ the Belleville washers increasingly collapse so that there are only small changes in shoe-tip effort for large piston movements and the hand brake gate control ensures parking at $f$ from piston positions corresponding to $k$; from $i$ to $j$ there is again a rapid increase in shoe-tip effort with piston travel since no further collapse of the Belleville washers between the piston and tappet is now possible, and clearly if the friction clutch is engaged with the locking means so extended corresponding to the maximum foot pedal effort the driver can apply the brake could not be released without dis-assembly unless the relaxation movement is greater than or equals the contraction of the drum upon cooling.

The point $g$ on the graph represents the point at which the lock might be operated in prior proposals in order to obtain locking, when all clearances have been taken up, at the point $f$.

The designed clearance built into the clutch is, of course, closely controlled, free axial movement of the head 18 being limited by mechanical stops provided on the tappet 7 and constituted by the clutch face 19 and the split ring 16 respectively.

I claim:

1. A lock actuator unit for a vehicle wheel brake, comprising an extensible strut operatively connected to said brake and normally freely movable to an extended position when subjected to tensile loading upon application of said brake and to contracted position when subjected to compressive loading upon release of said brake; a friction clutch associated with said strut and having an engaged condition in which it locks said strut against contraction and said brake against movement in a releasing direction; and clutch operating means for selecting the engaged and disengaged condition of said clutch, wherein said clutch comprises a pair of co-operating parts movable into and out of clutching engagement with each other, the said parts having a substantial working clearance which is always at a maximum when said strut is under tensile loading and which clearance must be taken up to permit said parts to move into clutching engagement, said parts being constructed and arranged that said maximum clearance is taken up solely in response to operation of said operating means coupled with movement of said brake in a releasing direction to the extent of maximum clearance.

2. A lock actuator unit according to claim 1, wherein said strut acts on a thrust transmitting member through the intermediary of a compression spring assembly having a predetermined minimum pre-stress, and having a limited degree of compressive deflection, and wherein said clearance between said clutch parts is less than the permitted deflection of said spring assembly.

3. A lock actuator unit in accordance with claim 1, when incorporated in an hydraulic slave cylinder for an internal shoe, vehicle drum brake.

4. A lock actuator according to claim 1, wherein said clutch operating means comprises a fluid pressure operated piston working in a cylinder formed in a thrust transmitting member having a clutch face forming one clutch part; the other of said clutch parts is fast with a part of said extensible strut and is engageable by said piston; and axial movement of the said strut part relative to said thrust transmitting member is positively restricted by mechanical stops such that the degree of free movement between the strut part and the thrust transmitting member corresponds to the said clearance between said clutch parts.

5. A lock actuator unit according to claim 4, including spring means acting directly on said piston to bias it away from said strut part.

* * * * *